March 30, 1926. 1,578,283
E. J. HAMMER
BEET TOPPER
Filed Feb. 29, 1924 4 Sheets-Sheet 1

WITNESSES
J. P. Schrott

INVENTOR
Ervin J. Hammer
BY
ATTORNEYS

March 30, 1926.  
E. J. HAMMER  
BEET TOPPER  
Filed Feb. 29, 1924  
1,578,283  
4 Sheets-Sheet 2

INVENTOR  
*Ervin J. Hammer*  
ATTORNEYS

March 30, 1926.
E. J. HAMMER
BEET TOPPER
Filed Feb. 29, 1924    4 Sheets-Sheet 3
1,578,283
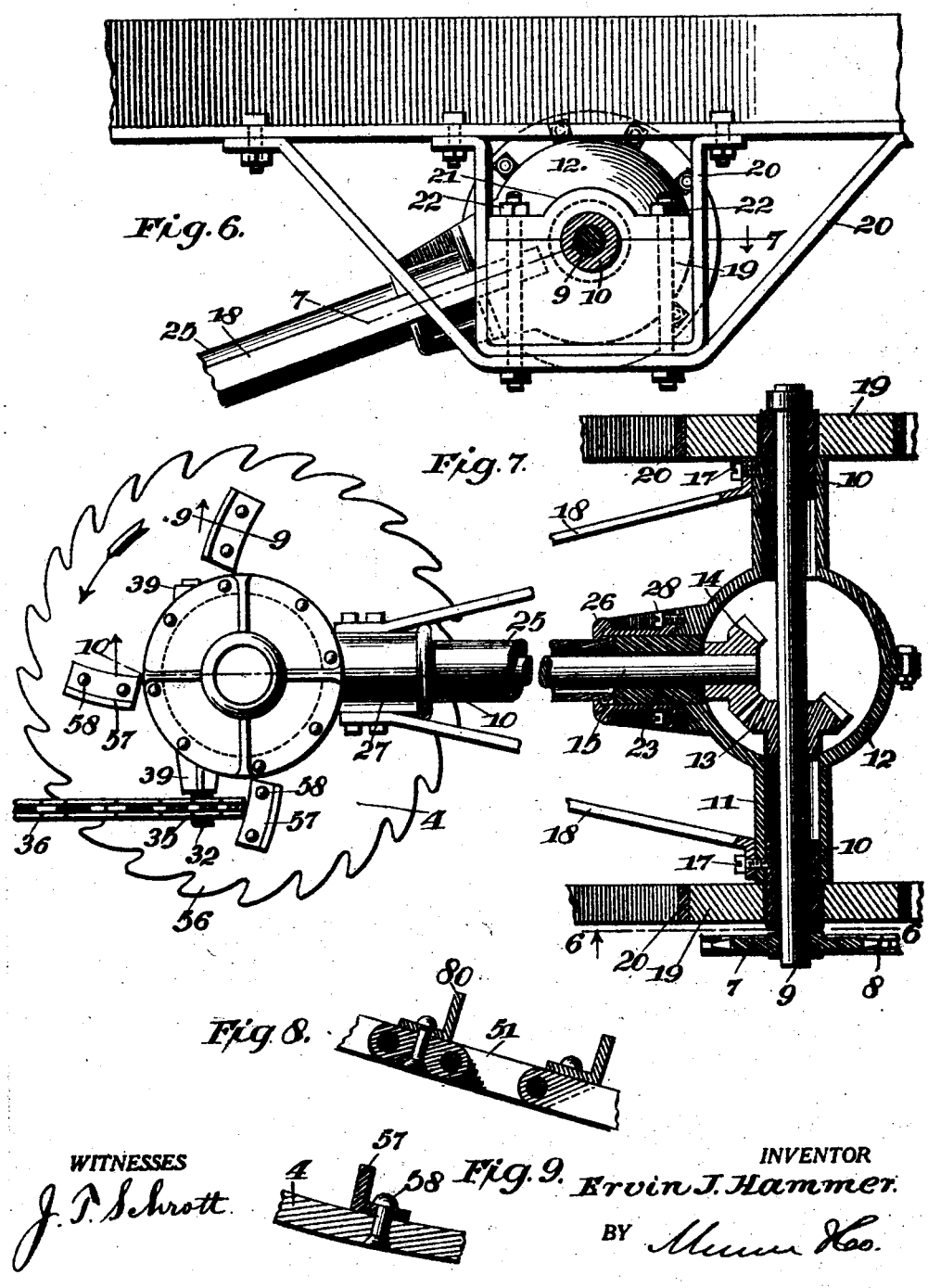
WITNESSES
J. T. Schrott
INVENTOR
Ervin J. Hammer.
BY
ATTORNEYS Patented Mar. 30, 1926.

1,578,283

UNITED STATES PATENT OFFICE.

ERVIN J. HAMMER, OF MILLER CITY, OHIO.

BEET TOPPER.

Application filed February 29, 1924. Serial No. 696,024.

*To all whom it may concern:*

Be it known that I, ERVIN J. HAMMER, a citizen of the United States, residing at Miller City, in the county of Putnam, State of Ohio, have invented certain new and useful Improvements in Beet Toppers, of which the following is a specification.

My invention relates to improvements in beet toppers, and it consists of the constructions, combinations and arrangements herein described and claimed.

An object of the invention is to provide a beet topper which is attachable to any suitable one of the several types of implements usually to be had upon the farm as an auxiliary to such implement but for the special purpose of topping beets, thereby making it possible to reduce the manufacturing cost of the topper to a minimum without sacrificing any of its advantages.

Another object of the invention is to provide a rotary beet topper having a depth gauging belt which operates in advance of the concave cutter disk and is driven by the driving means of the latter.

Another object of the invention is to provide a frame in which said belt operates, one portion of the frame being adjustable so that the altitude of the concave cutter may be regulated.

Figure 1:
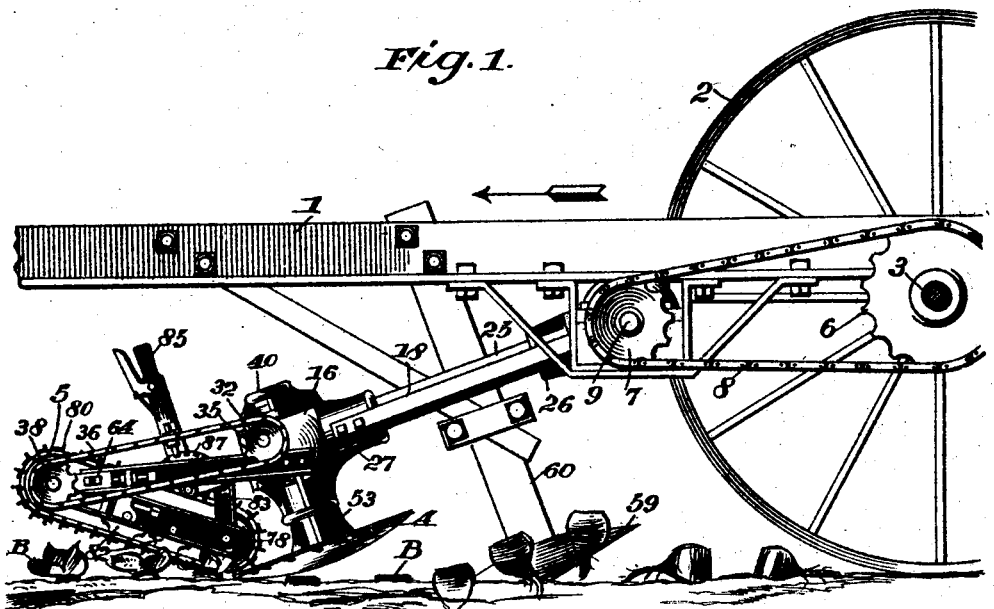
Figure 2:
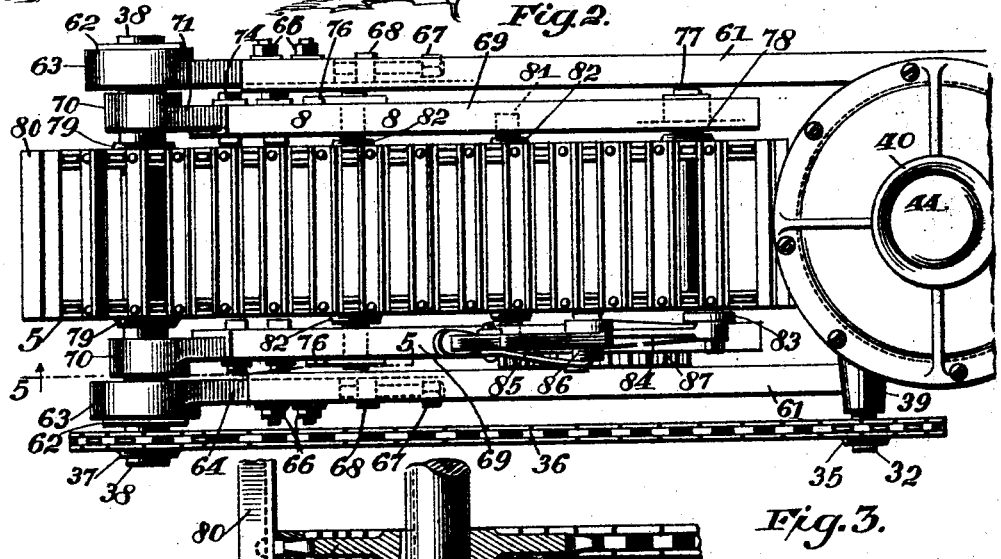
Figure 3:
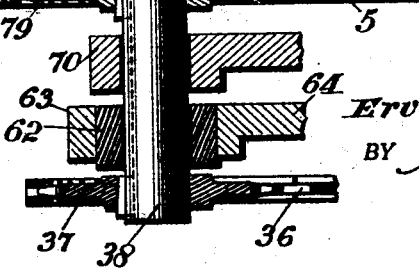
Figure 4:
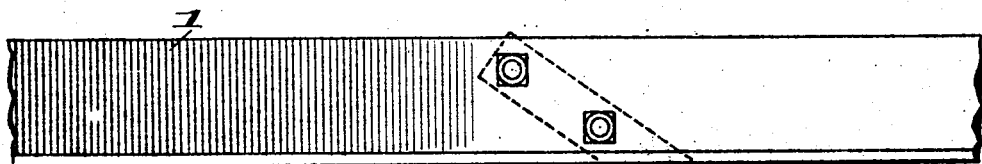
Figure 5:
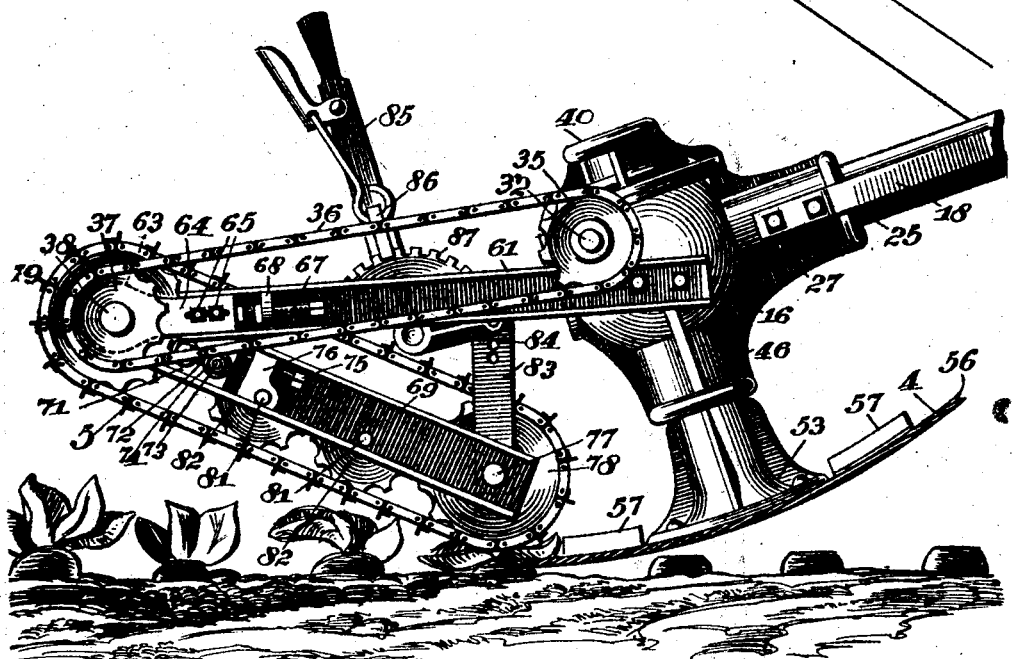
Figure 10:
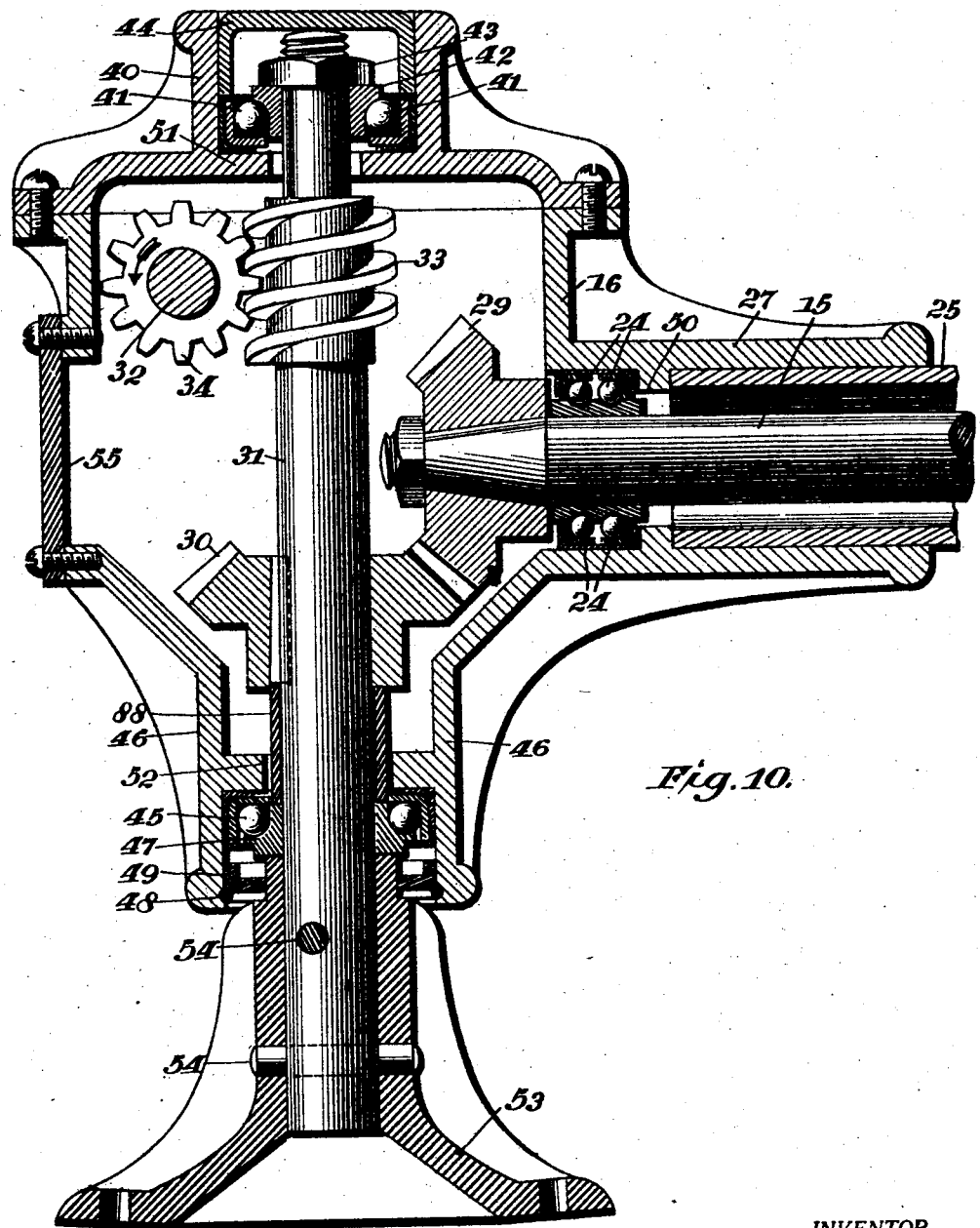

Other objects and advantages appear in the following description, reference being had to the accompanying drawings, in which:

Figure 1 is a side elevation of the improved beet topper, showing it applied to move in advance of a farm implement, Figure 2 is a plan view of the gauging belt and its associated driving means, Figure 3 is a detail section of one of the bearings in Figure 2, Figure 4 is a detail side elevation on a slightly larger scale of the main part of the beet topper in Figure 1, the topping disk being shown in section, Figure 5 is a detail section on the line 5—5 of Figure 2, Figure 6 is a detail view of the transmission housing, being taken on the line 6—6 of Figure 7, Figure 7 is horizontal section on the line 7—7 of Fig. 6, this view including a plan of the topping disk, Figure 8 is a detail section on the line 8—8 of Fig. 2, showing how the angle irons are riveted to the gauging belt, Figure 9 is a detail section on the line 9—9 of Figure 7, showing how the throwing ribs are attached to the topping disk, Figure 10 is an enlarged section of the gear housing taken on the line 10—10 of Figure 7.

Reference is first made to Figure 1 which illustrates how the improved beet topper is employed as an attachment or auxiliary to any suitable farm implement which may happen to be available for the purpose. This particular farm implement shown may, for example, be considered a harvester of which only the frame 1, wheel 2, and axle 3 are shown. The showing is sufficient to illustrate that the beet topper moves in advance of the drive axle 3, the topping disk 4 rising and falling to suit the occasion. This rising and falling is produced by the gauge belt 5 as it rides upon the tops of the beets B.

A sprocket or driving member 6, either originally, or subsequently mounted upon the axle 3 drives the sprocket 7 of a transmission mechanism by means of a chain 8. The sprocket 7 is mounted on one outer end of the transmission shaft 9 (Fig. 7), bushings 10 being provided for the latter in the housing 11. The tubular portions of the housing emerge from a central globular portion 12 in which bevel gears 13 and 14 are situated.

The first of these is fixed upon the shaft 9, the other upon a line shaft 15 which terminates in the gear housing 16 (Fig. 10) beneath which the topping disk 4 is supported. The bushings 10 (Fig. 7) are closely fitted into the ends of the tubular portions 11 where they may be secured by the same cap screws 17 which attach the upper ends of the braces 18. The bushings serve a double purpose in that they provide hinge mountings for the topping mechanism upon the implement frame 1 beside furnishing bearings for the shaft 9.

Blocks 19 supported by straps 20 beneath the frame 1 provide the complements to the hinge bushings 10. Caps 21, fastened upon the blocks at 22, bolt the bushings down in place. A bushing 23, similar to the bushings 10 furnish a bearing for the upper end of the line shaft 15. The lower end of this shaft is supported in the housing 16 by a bearing 24 (Fig. 10). A tubing 25 encloses the line shaft, one end of which is fastened to the bearing holder 26, the other in the sleeve 27 of the housing 16. The bearing holder is secured to the housing by cap screws 28.

Mounted on the lower end of the line shaft 15 inside of the housing 16 (Fig. 10) is a bevel pinion 29 which drives a pinion 30 on the upright topper shaft 31. This shaft in turn drives a countershaft 32 through a pair of gears 33 and 34 on the shafts 31 and 32, respectively, which in practice will be of suitable types and desired ratios. The shaft 32 carries a sprocket 35 to which a chain 36 is applied to drive the sprocket 37 on the foremost gauge shaft 38 (Figs. 1 and 2). The shaft 32 is supported by bearings 39 (Fig. 7) in the housing 16.

In reference to Fig. 10 the topper shaft 31 is shown to be of two diameters, the largest and longest occupying the main part of the housing, the shortest and smallest extending into the cover 40 where it is supported by a thrust bearing 41. The shaft carries a cone 42 which is held in place by a nut 43. Dust is excluded by a cap 44. A thrust bearing 45 and sleeve 88, near the bottom of the sleeve 46 of the housing, completes the support of the shaft 31. The shaft carries a second cone 47. The sleeve is disposed between the cone 47 and the pinion 30, aiding in the support of the shaft by contact with the latter.

A spring ring 48 holds a dust cap 49 in place at the entrance of the sleeve 46. It is to be observed that in each case the various bearings 24, 41 and 45 have adjacent flanges against which part of the bearing structure rests. In the case of the bearing 24 it is the flange 50, bearing 41 the flange 51, bearing 45 the flange 52. A coupling 53, pinned to the lower end of the shaft 31 at 54, provides the mounting for the topping disk 4. A plate 55 covers an opening at one side of the housing 16. This plate is removable to oil the interior of the housing or pack it with grease.

The topping disk 4 has the cutting edge formed into shear teeth 56 (Fig. 7) which quickly sever the tops from the beets. Ribs 57 riveted to the disk at 58, throw the tops to one side while the beets remain in the ground to be uprooted by a following plow 59 (Fig. 1). This plow is carried by a suitable beam 60 pendent from the implement frame.

Extending rigidly forward from the gear housing 16 is a fixed frame composed of a pair of channel arms 61 which constitute the main support of the gauge mechanism. This comprises the foremost gauge shaft 38, mentioned before, which is journalled in bushings 62 (Fig. 3) carried by bearing brackets 63. These include arms 64 which extend down between the flanges of the channels 61. The arms are slotted at 65 to admit bolts upon which the nuts 66 are tightened to hold the bearings.

Adjustments of the bearings upon the side arms 61 is accomplished by screws 67 which turn in screw bearings or lugs 68 and press against the adjacent ends of the bearings as clearly shown in Figures 1 and 4. The purpose of the adjustment of the bearings 63 is to regulate the tension of the driving chain 36.

Regulation of the chain as to tension requires the movement of the shaft 38 and its carried parts. These include the channel arms 69 of the movable gauge frame which have bearings 70 swung upon the shaft 38. The bearings 70 have arms 71, slotted at 72 (Fig. 5) to receive the bolts 73 upon which nuts 74 are tightened to hold the bearings. Screws 75 in bearings or lugs 76 press against the arms 71 to make adjustments of the gauge chain 5.

In making such adjustment the arms 69 will be pressed downward toward the lower end of the gauge mechanism. To this end the shaft 38 and bearing arms 71 must be regarded as relatively fixed. A shaft 77 at the lower end of the gauge frame carries a pair of sprockets 78, which together with similar sprockets 79 on the upper shaft 38, carry the chains 5. Angle irons 80 riveted to alternate links of the chains form a belt which readily grip the ground and beets to aid the forward motion of the topping mechanism.

Shafts 81 carry idler sprockets 82 which bear upon the lower strands of the chains 5. A link 83, pendent from the arm 84 of a lever 85 supports the movable gauge frame so that the lowermost end of the sprockets 78 occupies the required altitude or position above the ground. The lever has the usual detent 86 which engages the toothed quadrant 87 to maintain the adjustment of gauge sprockets 78.

The operation may be readily understood from the following additional description. The topping mechanism works in advance of the vehicle to which it is attached. For example, in Fig. 1 the topper is attached to a harvester by fastening the strap supported blocks 19 beneath frame. This fastening is of a temporary nature, permitting removal of the hopper mechanism when not wanted, or in the way of the harvester, (or other implement) when operated as such. The bushings 10 (Fig. 7) of the transmission mechanism swing in these blocks, both the gauge belt 5 and topping disk 4 moving in consonance with the unevenness of the ground and upstanding beet tops.

The main driving sprocket 6 furnishes the necessary power for the topping disk 4 to which it is transmitted by the gearing in the transmission mechanism (Fig. 7) and the housing 16 (Fig. 10). It also furnishes the power for the operation of the gauge belt 5 which crawls, as it were, in advance of the topping disk. The gauge belt supports the topping disk slightly above the ground.

As the beet tops protruding above the ground (Figs. 1 and 4) are approached the lower end of the gauge belt 5 at the sprockets 78 rides upon them and raises the topper disk 4 an appropriate distance to sever the beet top at the right place. The disk 4 rotates rapidly to perform the cutting operation, and as the tops are severed and fall on top they are thrown to the sides by the ribs 57.

By properly fixing the adjustment of the lever 85 the gauge belt may be held at the altitude desired. Adjustments of the driving chain 36 are made by the screws 67 upon having first loosened the nuts 66. Adjustments of the gauge belt are made by the screws 75 (Fig. 5) upon first loosening the nuts 74. In adjusting the tension of the chain 36 the shaft 38 is moved forward in respect to the side channels 61, but in adjusting the tension of the gauge belt 5 movement of the gauge frame 69 occurs in respect to the shaft 38; and act reverse in order to that of adjusting the chain 36.

While the construction and arrangement of the improved beet topper as herein described and claimed is that of a generally preferred form, obviously modifications and changes may be made without departing from the spirit of the invention or the scope of the claims.

I claim:

1. In combination with any ordinary farm vehicle having a drive shaft, a beet topper having means including a tubing by which it is temporarily suspended from the vehicle permitting removal when not wanted, an entire self-contained operating mechanism including a topping disk, means by which it is driven from the drive shaft, said means including a line shaft occupying said tubing and constituting the source of power of said topper and gauge means contacting the ground and beets in advance of the disk to support the disk in a cutting position.

2. The combination of a beet topper having a topping disk, means crawling in advance of the topping disk to support it in a cutting position above the ground, drive means which is common to both the disk and crawling means, a housing both containing the common drive means and carrying the topping disk, tubular means in connection with the housing, transmission mechanism upon which the tubular means is movable and which is affixed to a suitable vehicle of which the beet topper is not a part, said vehicle having a driving member, and means for connecting said driving member with said transmission mechanism.

3. The combination of a self-contained beet topper having a topping disk, means moving upon the ground and beets in advance of the disk gauging its altitude, a housing and frame work carrying the disk and gauging means, common driving means for both contained by the housing, transmission mechanism including a housing to which the aforesaid housing is attached, bearing means in which the housing is swingably attached to a vehicle of which the topper is not otherwise a part, means to drive the transmission mechanism from a moving part of the vehicle, and means for transferring driving power from said mechanism to the common driving means.

4. In combination with a suitable vehicle having a driving member and a frame, a bearing structure removably attached to the frame, transmission mechanism including a housing having bushings resting in the bearing structure for vertical swinging, means by which the driving member drives the transmission mechanism, and a beet topper mechanism including a housing containing topper driving means, a tubular member by which the housing is extended from the transmission mechanism, and an element contained by said tubular member transferring power from the transmission mechanism to said driving means.

5. A beet topper comprising a gear housing, a fixed frame extending therefrom, a frame movably mounted upon the fixed frame, a topping disk carried by the housing, gearing in said housing operating the disk, means constituting a belt carried by the movable frame contacting the ground and driven by said gearing, and means to adjust the movable frame in respect to the fixed frame to vary the cutting plane of the disk.

6. A beet topper having a fixed frame, a movable frame, a ground contacting belt carried by the movable frame, a shaft on the fixed frame upon which the movable frame swings and from which the belt is driven, means to drive said shaft, means to shift the shaft and its carried parts in one direction upon the fixed frame to adjust the driving means, and means to independently shift the movable frame in respect to said shaft to adjust said belt.

7. A beet topper having a topping disk and associated travelling gauge, common drive means for both comprising a line shaft having a pinion, a topper shaft carrying the disk and having a gear driven by the pinion, a countershaft from which the travelling gauge is driven, and meshing gears carried by the countershaft and topping shaft transmitting the driving power.

ERVIN J. HAMMER.